(12) United States Patent
Schumacher

(10) Patent No.: US 11,667,553 B2
(45) Date of Patent: Jun. 6, 2023

(54) METHOD AND SYSTEM FOR THE TREATMENT OF CYANIDE-CONTAINING FLUIDS

(71) Applicant: EISENMANN SE, Böblingen (DE)

(72) Inventor: Jochen Schumacher, Tübingen (DE)

(73) Assignee: EISENMANN SE, Böblingen (DE)

( * ) Notice: Subject to any disclaimer, the term of this patent is extended or adjusted under 35 U.S.C. 154(b) by 0 days.

(21) Appl. No.: 16/091,601

(22) PCT Filed: Apr. 6, 2017

(86) PCT No.: PCT/EP2017/058201
§ 371 (c)(1),
(2) Date: Oct. 5, 2018

(87) PCT Pub. No.: WO2017/174702
PCT Pub. Date: Oct. 12, 2017

(65) Prior Publication Data
US 2019/0084851 A1    Mar. 21, 2019

(30) Foreign Application Priority Data
Apr. 8, 2016   (DE) .................... 10 2016 004 061.0

(51) Int. Cl.
*C02F 1/72*   (2023.01)
*C02F 1/66*   (2023.01)
(Continued)

(52) U.S. Cl.
CPC ............... *C02F 1/722* (2013.01); *C02F 1/66* (2013.01); *C02F 1/725* (2013.01);
(Continued)

(58) Field of Classification Search
CPC ............ C02F 1/722; C02F 1/66; C02F 1/725; C02F 2301/08; C02F 2301/046; C02F 2209/06;
(Continued)

(56) References Cited

U.S. PATENT DOCUMENTS 3,900,555 A    8/1975   Jourdan-Laforte
4,416,786 A    11/1983  Knorre et al.
(Continued)

FOREIGN PATENT DOCUMENTS

CL    199000433    5/1990
CL    201401655    6/2014
(Continued)

OTHER PUBLICATIONS

Chemical Control of Pollution, Zhikuan, Yang, et al., pp. 292-296, Wuhan University Press, published Sep. 1998 (Cited in translation of Office Action in CN Pat. App. No. 201780021767.4 at paragraph 5 on p. 2, paragraph 2 on p. 4).
(Continued)

*Primary Examiner* — Nam X Nguyen
*Assistant Examiner* — Ekandra S. Miller-Cruz
(74) *Attorney, Agent, or Firm* — Schroeder Intellectual Property Law Group, LLC

(57) ABSTRACT

A method and system for treating cyanide-containing fluids, in particular cyanide-containing waste water, wherein cyanide-containing fluid is subject to a pretreatment in a pretreatment zone, in which at least one predetermined pH value and a predetermined temperature is set, wherein a base fluid is formed with the pretreatment. Base fluid is reacted at least with an oxidation means in at least one reaction reactor, whereby an oxidation reaction of the cyanide is initiated. Fluid from the reaction reactor is transferred as intermediate fluid into at least one process reactor, in which
(Continued)

conditions exist in which the oxidation reaction of the cyanide initiated in the reaction reactor can take place, wherein a process fluid is formed. A continuous flow of fluid is maintained at least periodically, wherein the base fluid is transferred continuously from the pretreatment zone into the reaction reactor, intermediate fluid is transferred continuously from the reaction reactor into the process reactor, and process fluid is removed continuously from the process reactor.

19 Claims, 1 Drawing Sheet

(51) Int. Cl.
*C02F 101/18* (2006.01)
*C02F 103/10* (2006.01)
*C02F 103/16* (2006.01)
*C02F 103/34* (2006.01)
*C02F 103/36* (2006.01)
*C02F 103/40* (2006.01)

(52) U.S. Cl.
CPC ...... *C02F 2101/18* (2013.01); *C02F 2103/10* (2013.01); *C02F 2103/16* (2013.01); *C02F 2103/343* (2013.01); *C02F 2103/36* (2013.01); *C02F 2103/40* (2013.01); *C02F 2209/003* (2013.01); *C02F 2209/02* (2013.01); *C02F 2209/06* (2013.01); *C02F 2301/046* (2013.01); *C02F 2301/08* (2013.01)

(58) Field of Classification Search
CPC ............ C02F 2209/02; C02F 2209/003; C02F 2103/40; C02F 2103/343; C02F 2103/16; C02F 2103/10; C02F 2101/18; C02F 2103/36
USPC .......................................................... 210/739
See application file for complete search history.

(56) References Cited

U.S. PATENT DOCUMENTS

| | | | | |
|---|---|---|---|---|
| 4,746,443 A | * | 5/1988 | Huang | C02F 1/025 |
| | | | | 210/752 |
| 4,802,995 A | * | 2/1989 | Dvorscek | A62D 3/35 |
| | | | | 210/766 |
| 4,915,849 A | | 4/1990 | Griffiths et al. | |
| 4,966,715 A | | 10/1990 | Ahsan et al. | |
| 5,093,007 A | * | 3/1992 | Domvile | C02F 9/00 |
| | | | | 210/667 |
| 5,178,775 A | | 1/1993 | Ahsan et al. | |
| 5,573,676 A | * | 11/1996 | Massholder | C02F 9/00 |
| | | | | 210/720 |
| 5,676,846 A | * | 10/1997 | Vickell | C02F 1/722 |
| | | | | 210/759 |
| 6,214,233 B1 | * | 4/2001 | Lewis, III | C02F 1/28 |
| | | | | 205/291 |
| 8,727,007 B1 | * | 5/2014 | Lewis, III | C02F 9/00 |
| | | | | 166/310 |
| 2011/0042234 A1 | * | 2/2011 | Magalnik | C02F 1/4674 |
| | | | | 205/744 |
| 2011/0176873 A1 | * | 7/2011 | Kim | B09C 1/02 |
| | | | | 405/128.75 |

FOREIGN PATENT DOCUMENTS

| | | |
|---|---|---|
| CN | 202 968 311 U | 6/2013 |
| CN | 103 232 107 A | 8/2013 |
| CN | 104 193 054 A | 12/2014 |
| DE | 31 25 452 | 1/1983 |
| DE | 42 28 460 | 3/1994 |
| DE | 43 14 521 | 11/1994 |

OTHER PUBLICATIONS

English Translation of Office Action in related CN Pat. App. No. 201780021767.4, 6 pages.

* cited by examiner

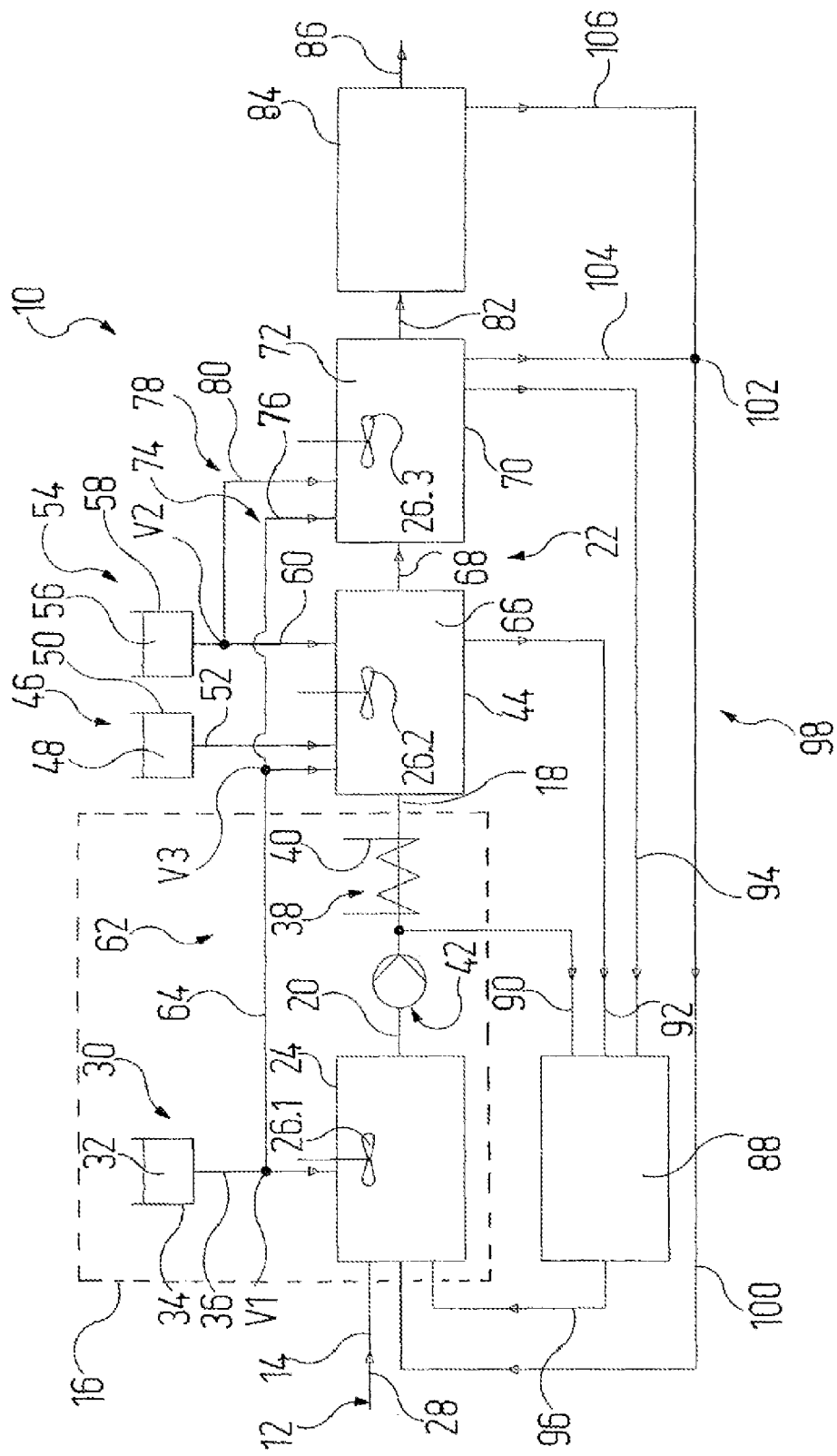

METHOD AND SYSTEM FOR THE TREATMENT OF CYANIDE-CONTAINING FLUIDS

RELATED APPLICATIONS

This application is a national phase of International Patent Application No. PCT/EP2017/058201 filed Apr. 6, 2017, which claims priority to German Patent Application No. 10 2016 004 061.0 filed Apr. 8, 2016—the contents of both of which are incorporated herein by reference.

FIELD OF THE INVENTION

The invention relates to a method for treating cyanide-containing liquids, more particularly cyanide-containing wastewater, wherein
  a) cyanide-containing liquid is subjected in a pretreatment zone to a pretreatment wherein at least a specified pH and a specified temperature are established, the pretreatment forming a base liquid;
  b) base liquid in at least one reaction reactor is admixed at least with an oxidizing agent, thereby initiating an oxidation reaction of the cyanides and forming an intermediate liquid.

The invention relates, moreover, to a plant for treating cyanide-containing liquids, more particularly cyanide-containing wastewater, having
  a) a pretreatment zone, in which cyanide-containing liquid can be subjected to a pretreatment wherein at least a specified pH and a specified temperature can be established, the pretreatment forming a base liquid;
  b) at least one reaction reactor in which base liquid can be admixed at least with an oxidizing agent, thereby initiating an oxidation reaction of the cyanides.

BACKGROUND OF THE INVENTION

There are many sectors of industry that produce wastewaters that are burdened with high salt concentrations and also with toxic or persistent substances and compounds, and that cannot be freed from the unwanted constituents by biological purification and clarification processes. Such wastewaters are processed in chemico-physical operations.

In the present context, the wastewaters treated are those burdened with cyanides. The term "cyanide" refers to all salts and compounds of hydrogen cyanide HCN (hydrocyanic acid; prussic acid). These include, for example, hydrogen cyanide, cyanides of alkali and alkaline-earth metals, numerous metal complex compounds, such as $Zn(CN)_2$ and potassium hexacyanidoferrate(III) and the like, and also other compounds such as thiocyanates and cyanohydrins. Depending on the stability of the cyanide compounds, they are customarily subdivided into free cyanide, readily releasable cyanide and stable metal cyanide complexes.

Cyanides which after acidification to a pH of less than 4 are easily converted into hydrogen cyanide HCN are understood as free cyanide. These are hydrogen cyanide and cyanides of alkali and alkaline-earth metals. The cyanide ion reacts as a ligand in conjunction with various metals to form metal cyanide complexes. The stability of the complexes is dependent on the oxidation number of the metal ion, hence producing the subdivision identified above. The group of the readily releasable cyanides includes not only the free cyanides but also complexes with silver Ag, cadmium Cd, copper Cu, mercury Hg, nickel Ni, and zinc Zn. Metal cyanide complexes of low to moderate stability are referred to as being "weak acid dissociable" (WAD). Far more stable are iron complexes, especially iron(II) complexes, these being penetration complexes rather than addition complexes. They are robust even in concentrated sulfuric acid. Stable metal cyanide complexes are referred to as being strong acid dissociable (SAD). According to DIN 38405-13, complexes with cobalt are captured only partly when determining readily releasable cyanide, and consequently will be assigned here to the stable metal cyanide complexes.

For the present purposes, the term "cyanide" is to be taken to embrace even simple nitriles R—CN, such as acetonitrile or benzonitrile, and also cyanate ions ($OCN^-$), thiocyanate ions ($SCN^-$), and cyanogen chloride (ClCN) and derivatives thereof, despite the fact that DIN 38405-13 does not class such compounds as cyanides.

The ratio between free cyanides and metal cyanide complexes in water is dependent on the pH and on the concentrations of the heavy metals which are capable of forming metal cyanide complexes. In the alkaline range, free cyanide is in completely dissociated form, and forms stable metal complexes. In a neutral or acidic environment, the free cyanide is weakly dissociated and preferentially forms hydrogen cyanide. Weakly complexed metal cyanides undergo decomposition at pH levels of less than 4, contributing to the increased formation of hydrogen cyanide.

Above a certain concentration, all compounds of cyanide cause toxic damage to humans and the environment. In this context, hydrogen cyanide or the cyanide ion is ascribed by far the greatest toxic effect. This cyanide ion acts as a nonspecific enzyme inhibitor and acquires its high toxicity through the inhibition of the enzyme cytochrome c oxidase, and so cellular respiration is prevented and cell death occurs. At low doses, symptoms include those of irritation to mucous membranes, headache, vertigo, breathlessness, palpitations, and vomiting. High doses lead to suffocation cramps and to respiratory and circulatory arrest. Late damage to the central nervous system is also known. In view of the low boiling temperature of 25° C., HCN is frequently taken in via the airways. A dose of just 200-300 ppm leads to death. The lethal dose on oral ingestion is 1 mg $CN^-$ kg bodyweight. The MAC is 1.9 ppm.

Cyanides are known to affect biological processes in wastewater treatment. For instance, while there are some microorganisms that can break down cyanides, the effects of cyanides in elevated concentrations on biological processes are adverse. By inhibiting cellular respiration, the presence of cyanides frequently brings about inactivation of the microorganisms. Moreover, the release of heavy metal brought about by cyanide breakdown may result in additional inhibition of the biological processes. With regard to free cyanides, concentrations greater than 0.2 mg/l for nitrification and greater than 5 mg/l for denitrification ought to be avoided in order to ensure stable plant operation. Metal complex cyanides, in contrast, on account of their lower toxicity, lead to partial inactivation of the biological processes only at relatively high concentrations.

The majority of cyanides in surface water bodies are attributable to industrial sources; cyanide compounds are employed numerously in various branches of industry, and enter the surface water bodies through wastewaters. These cyanide-containing wastewaters originate primarily from the industrial fields of metal cleaning and metal coating, electroplating, metal processing, production of automobile parts, the processing of steel, more particularly in the tempering of the steel, mining, photography, the pharmaceutical industry, coking, ore leaching, and the manufacture of pesticides and plastics. In the majority of industrial applications, cyanides are employed for their propensity to form metal complexes. Cyanide-containing solutions find application, for example, in metals recovery and in the mining industry for extraction of metals such as gold Au and silver Ag from the ore. Within electroplating operations, cyanide-containing solutions are used in order to keep metal ions such as zinc Zn and cadmium Cd in solution in a neutral to alkaline environment. In the chemical industry, cyanides are utilized for production of other chemicals such as acrylonitrile, adiponitrile, and methyl methacrylate. Wastewaters with cyanide loading come about in the steel industry in connection with the processing of blast furnace gas using gas scrubbers, and with distillation processes in the coking plant. Cracking and delayed coke formation in the mineral oil industry likewise cause cyanide-containing wastes and wastewaters.

SUMMARY OF THE INVENTION

It is an object of the invention to provide a method and a plant of the type specified at the outset that enable effective, resource-sparing, and energy-saving treatment of cyanide-containing wastewaters.

This object, in the case of a method of the type specified at the outset, is achieved in that c) liquid from the reaction reactor is transferred as intermediate liquid into at least one process reactor, in which conditions prevail under which the cyanide oxidation reaction initiated in the reaction reactor is able to proceed, forming a process liquid;

d) at least periodically a continuous liquid stream is maintained, wherein
  da) base liquid is transferred continuously from the pretreatment zone into the reaction reactor;
  db) intermediate liquid is transferred continuously from the reaction reactor into the process reactor; and
  dc) process liquid is withdrawn continuously from the process reactor.

In accordance with the invention, therefore, cyanide detoxification takes place in a continuous process in an at least two-stage reactor cascade, and not in a batch process. This is not to rule out temporary working in batch operation in the event, for example, of disruptions or of high cyanide concentrations which must first be brought down. The process liquid withdrawn from the process reactor has a residual cyanide concentration which is smaller than the cyanide concentration of the base liquid and smaller than the cyanide concentration of the intermediate liquid. The cyanide concentration of the process liquid ought, therefore, not to exceed a specified threshold or limiting value that defines a permissible cyanide concentration, at which a liquid may be said to have been detoxified of cyanide.

This method may in particular be carried out if said oxidizing agent used is hydrogen peroxide.

If additionally a catalyst and/or a pH modifier is added demand-dependently to the reaction reactor, the reaction conditions during the method can be adapted to the particular prevailing requirements.

With preference said catalyst used is copper in the form of a copper sulfate solution and/or said pH modifier used is aqueous sodium hydroxide solution.

If a pH modifier, more particularly aqueous sodium hydroxide solution, and/or an oxidizing agent, more particularly hydrogen peroxide, is added demand-dependently to the process reactor, the reaction conditions there as well can be adapted during the method to the particular prevailing requirements.

To allow conclusions to be drawn about the progress of the reactions in the pretreatment zone, in the reaction reactor, or in the process reactor, it is necessary in particular to determine the respective cyanide concentration. For this purpose it is especially useful if base liquid and/or intermediate liquid and/or process liquid is returned into the pretreatment zone by means of an analytical circuit facility, the analytical circuit facility ascertaining the cyanide concentration in the respective liquid. In this way, from the respective cyanide concentration, conclusions can be drawn about the requirements in the respective reactor, and the reaction conditions can be adapted accordingly, with the liquids not being removed from the system.

In order to influence the course of the method, it may additionally be an advantage to return process liquid demand-dependently into the pretreatment zone. In this way, the base liquid can be diluted as and when required.

For this purpose it may further be advantageous if process liquid on withdrawal is transferred at least partly into a storage vessel, and liquid from the storage vessel is returned demand-dependently into the pretreatment zone. The liquid present in the storage vessel has then generally been freed from cyanide.

The pH in the continuous liquid stream is preferably held largely constant, more particularly in a range between 9 and 10, and/or the temperature of the liquid stream is preferably held largely constant, more particularly in a range between 40° C. and 60° C.

The object indicated above, in the case of a plant of the type specified at the outset, is achieved in that c) liquid from the reaction reactor can be transferred as intermediate liquid into at least one process reactor, in which conditions prevail under which the cyanide oxidation reaction initiated in the reaction reactor is able to proceed, forming a process liquid;

d) by means of a pump system, at least periodically, a continuous liquid stream can be maintained, wherein
  da) base liquid is transferred continuously from the pretreatment zone into the reaction reactor;
  db) intermediate liquid is transferred continuously from the reaction reactor into the process reactor; and
  dc) process liquid is withdrawn continuously from the process reactor.

Advantageously, moreover, the plant comprises some or all of the features specified in dependent claims 11 to 17. The advantages in this case correspond to the advantages elucidated above regarding the respectively corresponding features in relation to the method.

BRIEF DESCRIPTION OF THE DRAWING

Elucidated in more detail now below is a working example of the invention, with reference to the single FIGURE. The FIGURE shows, diagrammatically, a plant 10 for treating cyanide-containing liquid 12, which in particular may be cyanide-containing wastewater 14 from industrial processes, of the kind elucidated at the outset.

DETAILED DESCRIPTION OF THE INVENTION

The plant 10 comprises a pretreatment zone 16, in which cyanide-containing liquid 12 is subjected to a pretreatment wherein at least a specified pH and a specified temperature are established. The pretreatment forms a base liquid 18 which after the pretreatment passes out of the pretreatment zone 16 via a transfer line 20 into a reaction zone 22.

The pretreatment zone 16 comprises a pretreatment reactor 24, in which the liquid present therein is stirred with a stirrer 26.1, indicated only in stylized fashion, and so liquid components that are present are intimately mixed.

The cyanide-containing liquid 12 to be treated is fed to the pretreatment reactor 24 through a feed line 28. Moreover, by means of a pH metering facility 30, a pH modifier 32 is metered into the pretreatment reactor 24, said facility having a pH reservoir vessel 34 for the pH modifier 32 and having an associated pH delivery line 36, which in turn opens out into the pretreatment reactor 24 and comprises a metering valve V1.

Aside from the metering valve V1 and valves indicated later on below, at all locations in the plant 10 at which a flow of liquid must be interrupted, released, constricted or increased, corresponding valves are installed, in a manner known per se.

In the case of the present working example, the pH modifier 32 is aqueous sodium hydroxide solution NaOH. The pH of the liquid in the pretreatment reactor 24 is monitored by means of sensors, which are not shown separately and which are known per se; depending on the pH ascertained therein, and in comparison to a setpoint pH, the pH metering facility 30 increases, reduces or interrupts the feed of pH modifier 32.

So that the base liquid generated in the pretreatment zone 16 by the pretreatment reaches the reaction zone 22 with a defined temperature, a temperature control facility 38 is present. In the case of the present working example, the temperature control facility 38 takes the form of a heat exchanger 40, through which the transfer line 20 passes. In a modification, not shown separately, it is also possible for a heating assembly or the like to be provided on the pretreatment reactor 24, so that the base liquid is formed in the pretreatment reactor 24. The base liquid 18 is to have a temperature of between 40° C. and 60° C., more particularly a temperature of 50° C.

The liquids in the plant 10 are conveyed in a conventional way by means of a pump system 42, of which, by way of example, only one conveying pump is shown, this pump being disposed in the transfer line 20 and not carrying a separate reference numeral.

The transfer line 20 then opens out, in the reaction zone 22, into a reaction reactor 44 which is equipped with a stirrer 26.2. A catalyst 48 is metered to the reaction reactor 44 by means of a catalyst metering facility 46 which comprises a catalyst reservoir vessel 50 for the catalyst 48, and an associated catalyst delivery line 52, which opens in turn into the reaction reactor 44. In the case of the present working example, the catalyst 48 is copper sulfate $CuSO_4$, and a $CuSO_4$ solution is used. In the case of the present working example, the strength of the $CuSO_4$ solution used is 10 to 20%.

The reaction reactor 44 is also metered, by means of an oxidizing agent metering facility 54, with an oxidizing agent 56, said facility having an oxidizing agent reservoir vessel 58 for the oxidizing agent 56, and an associated oxidizing agent delivery line 60, which in turn opens out into the reaction reactor 44 and in which a metering valve V2 is disposed. In the case of the present working example, the oxidizing agent 56 is hydrogen peroxide $H_2O_2$, and the strength of the $H_2O_2$ solution used is 25 to 50%.

Furthermore, pH modifier 32 may be metered to the reaction reactor 44 via a second pH metering facility 62. For this purpose, in the case of the present working example, a pH branch line 64 leads off from the metering valve V1 in the pH delivery line 36 of the pH metering facility 30. The amount of pH modifier 32 delivered here may be set independently of the amount which is metered to the pretreatment reactor 24. The metering valve V1 takes the form of a multiway valve, through which the volume flow through the pH delivery line 36 and the pH branch line 64 can be set. Additionally there is a metering valve V3 disposed in the pH branch line 64.

By the addition of catalyst 48 and oxidizing agent 56, an oxidation reaction of the cyanides is initiated in the reaction reactor 44, and an intermediate liquid 66 is formed.

In the case of the use of $H_2O_2$ as oxidizing agent, and in the presence of copper as catalyst, cyanide ions are oxidized to cyanate as follows: $CN^- + H_2O_2 - (Cu) \rightarrow OCN^- + H_2O$. This reaction can proceed in a relatively large pH range of between 3 and 12. While the conduct of the reaction at a pH of 4 to 5 is known, a pH established in the present case in the pretreatment is preferably between 9 and 10, and is then maintained in the reaction reactor 44. With pH values of this kind it is possible largely to prevent the release of hydrogen cyanide HCN and to ensure the stability of $H_2O_2$.

Cyanate is subsequently hydrolyzed and is oxidized further to carbonate $CO_3^-$ and ammonia $NH_3$ in the alkaline range. In the acidic range, cyanate could be oxidized to carbon dioxide $CO_2$ and ammonium $NH_4^+$.

The reaction reactor 44 is joined by a connecting line 68 to a process reactor 70 of the reaction zone 22, through which the intermediate liquid 66 is transferred into the process reactor 70. The process reactor 70 is equipped with a stirrer 26.3. Under the conditions prevailing in the process reactor 70, the cyanide oxidation reaction initiated in the reaction reactor 44 is able to proceed, and a process liquid 72 is formed.

Via a third pH metering facility 74, pH modifier 32 can be metered to the process reactor 70. For this purpose, in the case of the present working example, a further pH branch line 76 leads off from the metering valve V3 in the pH branch line 64 of the second pH metering facility 62. The amount of pH modifier 32 delivered in this case may be set independently of the amount which is metered to the pretreatment reactor 24. The metering valve V3 is in the form, correspondingly, of a multiway valve, allowing the respective volume flow through the pH branch lines 64 and 76 to be set.

Furthermore, oxidizing agent 56 may be fed to the process reactor 68 via a second oxidizing agent metering facility 78. For this purpose, in the case of the present working example, an oxidizing agent branch line 80 leads off from the metering valve V2 in the oxidizing agent delivery line 60 of the first oxidizing agent metering facility 54. In this case the amount of oxidizing agent 56 delivered may be set independently of the amount which is metered to the reaction reactor 44. The metering valve V2 is in the form, correspondingly, of a multiway valve, allowing the respective volume flow through the oxidizing agent delivery line 60 and the oxidizing agent branch line 80 to be set.

The process reactor 70 is joined via a storage line 82 to a storage vessel 84, allowing process liquid 72 to be transferred into the storage vessel 84. The storage vessel 84 has an outlet line 86 by means of which liquid can be taken off from the storage vessel 84.

The cyanide content of the liquids present in the plant may be ascertained with the aid of a cyanide analysis facility 88 at various stages during the ongoing treatment, so that the course of treatment, the temperature during the pretreatment, and the metering of catalyst 48 and oxidizing agent 56 may be adapted as a function of the results of the analysis.

For this purpose, the transfer line 20, the reaction reactor 44, and the process reactor 70 are joined via a respective analytical circuit line 90, 92 and 94 to the cyanide analysis facility 88, in which the liquids from each of the analytical circuit lines 90, 92, and 94 can be analyzed separately for their cyanide concentration.

The cyanide analysis facility 88 comprises a circuit collector line 96, via which the component streams are returned into the pretreatment reactor 24. Overall, therefore, the analytical circuit lines 90, 92, 94, with the cyanide analysis facility 88 and the circuit collector line 96, form an analytical circuit facility 88, 90, 92, 94, 96, by means of which base liquid 18 and/or intermediate liquid 66 and/or process liquid is returned into the pretreatment zone 16, with the analytical circuit facility 88 ascertaining the cyanide concentration in the respective liquid 66, 72, and 88.

Furthermore, the pretreatment reactor 24 is also joined via a recycle system 98 to the process reactor 70 and to the storage vessel 84. For this purpose, a recycle collector line 100 leads from a multiway valve 102 to the pretreatment reactor 24; a recycle line 104 from the process reactor 70 and a recycle line 106 from the storage vessel 84 open out into the multiway valve 102.

Each reactor 24, 44, and 70 and the storage vessel 84 are connected to a waste air system, which is not shown separately but which, by continuous removal of the air under suction, develops a subatmospheric pressure in the reactors 24, 44, and 70 and in the storage vessel 84. The air removed may be treated thermally in a waste air combustion unit, which again is not shown separately.

The plant 10 is operated in a continuous process. For this purpose, the pump system 42 is set up so as to enable a continuous liquid stream to be maintained, in which base liquid 18 is transferred continuously from the pretreatment zone 16 into the reaction reactor 44, intermediate liquid 66 is transferred continuously from the reaction reactor 44 into the process reactor 70, and process liquid 72 is withdrawn continuously from the process reactor 70.

The reaction parameters pH, temperature, and cyanide concentration are monitored during the course of the treatment. From the reaction parameters ascertained, the respective demand for pH modifier 32, for catalyst 48, and for oxidizing agent 56 is ascertained for a trouble-free reaction profile in the pretreatment reactor 24, in the reaction reactor 44, and in the process reactor 70. pH modifier 32, catalyst 48, and oxidizing agent 56 are then each metered in demand-dependently at the corresponding location.

The pH in the continuous liquid stream is preferably held largely constant and more particularly is held within the aforementioned range of between 9 and 10. The temperature in the continuous liquid stream is likewise preferably held constant, more particularly in the range stated above, for the base liquid 18, of between 40° C. and 60° C., and preferably at 50° C.

Through the recycling of process liquid 72 from the process reactor 70 or of liquid from the storage vessel 84, it is possible, as and when required, to dilute the liquid in the pretreatment reactor 24, so that the cyanide concentration of the base liquid 18 that enters into the reaction zone 22 is lower than in the absence of this measure.

If the analysis of the process liquid in the process reactor 70 reveals the cyanide concentration there to exceed the abovementioned permissible threshold or limiting value for a solution detoxified of cyanide, the storage line 82 is closed and the process liquid is returned into the pretreatment reactor 24 until the cyanide concentration in the process reactor 70 has dropped to a level allowing the process liquid with the permissible residual cyanide concentration to be withdrawn and fed to the storage vessel 84.

The plant 10 elucidated above is formed in two stages, with the reaction reactor 44 and the process reactor 70. In the case of modifications, which are not separately shown, the process reactor 70 may be followed by further reactors, with cyanide detoxification therefore taking place in a continuous process in a three-stage, four-stage or even higher multistage reactor cascade.

What is claimed is:

1. A method for treating cyanide-containing liquids comprising the steps of:
    subjecting cyanide-containing liquid to a pretreatment in a pretreatment zone wherein at least a specified pH using a pH modifier and a specified temperature are established, the pretreatment forming a base liquid;
    transferring the base liquid to at least one reaction reactor located downstream from the pretreatment zone;
    providing a first amount of an oxidizing agent to the at least one reaction reactor in a controlled manner and admixing the base liquid in the at least one reaction reactor with at least the oxidizing agent, thereby initiating an oxidation reaction of cyanides in the cyanide-containing liquid;
    selectively supplying the pH modifier to the at least one reaction reactor independently of any pH modifier supplied to the pretreatment zone;
    selectively supplying a catalyst to the at least one reaction reactor;
    transferring liquid from the at least one reaction reactor as intermediate liquid into at least one process reactor located downstream from the at least one reaction reactor;
    providing a second amount of the oxidizing agent to the at least one process reactor in a controlled manner, the second amount of the oxidizing agent being provided to the at least one process reactor being independent of the first amount of the oxidizing agent provided to the at least one reaction reactor, the at least one process reactor having conditions under which the cyanide oxidation reaction initiated in the at least one reaction reactor is able to proceed, forming a process liquid;
    selectively supplying the pH modifier to the at least one process reactor independently of any pH modifier supplied to the pretreatment zone or the at least one reaction reactor;
    analyzing a cyanide content of the base liquid, the intermediate liquid treated with the oxidizing agent and removed from the at least one reaction reactor, and the process liquid treated with the oxidizing agent and removed from the at least one process reactor, and selectively adjusting one or more of a pretreatment temperature, the first amount of the oxidizing agent, the second amount of the oxidizing agent, or the catalyst, in response to the cyanide content of the base liquid, the intermediate liquid removed from the at least one reaction reactor and/or the process liquid removed from the at least one process reactor; and
    maintaining at least periodically a continuous liquid stream, wherein
        the base liquid is transferred continuously from the pretreatment zone into the at least one reaction reactor;
        the intermediate liquid is transferred continuously from the at least one reaction reactor into the at least one process reactor; and the process liquid is withdrawn continuously from the at least one process reactor.

2. The method as claimed in claim 1, wherein the oxidizing agent is hydrogen peroxide.

3. The method as claimed in claim 1, wherein the catalyst is copper in the form of a copper sulfate solution and/or the pH modifier is aqueous sodium hydroxide solution.

4. The method as claimed in claim 1, wherein the base liquid and/or the intermediate liquid and/or the process liquid is returned into the pretreatment zone by means of an analytical circuit facility, the analytical circuit facility ascertaining the cyanide concentration in the liquid returned into the pretreatment zone.

5. The method as claimed in claim 1, wherein the process liquid is returned demand-dependently into the pretreatment zone.

6. The method as claimed in claim 1, wherein the process liquid on withdrawal is transferred at least partly into a storage vessel, and liquid from the storage vessel is returned demand-dependently into the pretreatment zone.

7. The method as claimed in claim 1, wherein the pH in the continuous liquid stream is held largely constant.

8. A plant for treating cyanide-containing liquids comprising:
   a pH reservoir holding a pH modifier;
   a catalyst reservoir holding a catalyst;
   a pretreatment zone, in which cyanide-containing liquid is subjected to a pretreatment wherein the pH modifier is provided so that at least a specified pH and a specified temperature of the cyanide-containing liquid is established, the pretreatment forming a base liquid;
   at least one reaction reactor located downstream from the pretreatment zone;
   a first line to provide a first amount of oxidizing agent to the at least one reaction reactor and a catalyst line to provide the catalyst to the at least one reaction reactor, wherein the base liquid transferred from the pretreatment zone is admixed at least with the first amount of the oxidizing agent and the catalyst, thereby initiating an oxidation reaction of cyanides in the cyanide-containing liquid in the at least one reaction reactor;
   a first pH branch line selectively supplying the pH modifier to the at least one reaction reactor;
   liquid from the at least one reaction reactor can be transferred as intermediate liquid into at least one process reactor;
   a second line providing a second amount of the oxidizing agent to the at least one process reactor, the second amount of the oxidizing agent being independent of the first amount of the oxidizing agent, and further wherein conditions prevail in the at least one process reactor so that the cyanide oxidation reaction initiated in the at least one reaction reactor is able to proceed, forming a process liquid;
   a second pH branch line selectively supplying the pH modifier to the at least one process reactor;
   a first analytical circuit line continuously providing the base liquid from the pretreatment zone to a cyanide analysis facility to monitor an amount of cyanide in the base liquid;
   a second analytical circuit line continuously providing the intermediate liquid from the at least one reaction reactor to the cyanide analysis facility to monitor an amount of cyanide in the intermediate liquid;
   a third analytical circuit line continuously providing process liquid from the at least one process reactor to the cyanide analysis facility to monitor an amount of cyanide in the process liquid; and
   a continuous liquid stream is at least periodically maintained by means of a pump system wherein
      the base liquid is transferred continuously from the pretreatment zone into the at least one reaction reactor;
      the intermediate liquid is transferred continuously from the at least one reaction reactor into the at least one process reactor; and
      the process liquid is withdrawn continuously from the at least one process reactor.

9. The plant as claimed in claim 8, wherein the oxidizing agent is hydrogen peroxide.

10. The plant as claimed in claim 8, wherein additionally a catalyst by means of a catalyst metering facility, and/or the pH modifier by means of a pH metering facility, is added demand-dependently to the at least one reaction reactor.

11. The plant as claimed in claim 10, wherein the catalyst is copper in the form of a copper sulfate solution and/or the pH modifier is aqueous sodium hydroxide solution.

12. The plant as claimed in claim 8, wherein a pH modifier by means of a pH metering facility, and/or an oxidizing agent by means of an oxidizing agent metering facility, is added demand-dependently to the at least one process reactor.

13. The plant as claimed in claim 8, wherein the base liquid and/or the intermediate liquid and/or the process liquid is returned into the pretreatment zone by means of an analytical circuit facility, the analytical circuit facility being able to ascertain the cyanide concentration in the liquid returned into the pretreatment zone.

14. The plant as claimed in claim 8, wherein the process liquid is returned demand-dependently via a recycle system into the pretreatment zone.

15. The plant as claimed in claim 8, wherein there is a storage vessel into which the process liquid on withdrawal is at least partly transferrable, and liquid from the storage vessel is returned demand-dependently into the pretreatment zone.

16. The method as claimed in claim 1, wherein the pH modifier is aqueous sodium hydroxide solution and/or the oxidizing agent is hydrogen peroxide.

17. The method as claimed in claim 7, wherein the pH in the continuous liquid stream is held largely constant in a range between 9 and 10.

18. The method as claimed in claim 1 further comprising the step of controlling the temperature of the base liquid while it is transferred from the pretreatment zone to the at least one reaction reactor.

19. The method as claimed in claim 7, wherein the temperature of the continuous liquid stream is held largely constant in a range between 40° C. and 60° C.

* * * * *